US010662697B2

(12) United States Patent
Frapsauce

(10) Patent No.: US 10,662,697 B2
(45) Date of Patent: May 26, 2020

(54) METHOD FOR DETECTING AN OBJECT IN AN OPENING AREA OF A DOOR OF A MOTOR VEHICLE, DRIVER ASSISTANCE SYSTEM, AND MOTOR VEHICLE

(71) Applicant: VALEO Schalter und Sensoren GmbH, Bietigheim-Bissingen (DE)

(72) Inventor: Alice Frapsauce, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 396 days.

(21) Appl. No.: 15/534,807

(22) PCT Filed: Dec. 2, 2015

(86) PCT No.: PCT/EP2015/078343
§ 371 (c)(1),
(2) Date: Jun. 9, 2017

(87) PCT Pub. No.: WO2016/091677
PCT Pub. Date: Jun. 16, 2016

(65) Prior Publication Data
US 2017/0321468 A1 Nov. 9, 2017

(30) Foreign Application Priority Data
Dec. 10, 2014 (DE) .......................... 10 2014 118 318

(51) Int. Cl.
*E05F 15/73* (2015.01)
*G01S 15/04* (2006.01)
(Continued)

(52) U.S. Cl.
CPC .............. *E05F 15/73* (2015.01); *E05F 15/43* (2015.01); *G01S 7/52004* (2013.01);
(Continued)

(58) Field of Classification Search
CPC ...... E05F 15/73; E05F 15/43; E05F 2015/763; G01S 15/08; G01S 15/93; G01S 7/52004;
(Continued)

(56) References Cited

U.S. PATENT DOCUMENTS

| 2005/0174077 A1 | 8/2005 | Haag et al. |
| 2007/0192038 A1* | 8/2007 | Kameyama ........ G01C 21/3641 702/19 |

(Continued)

FOREIGN PATENT DOCUMENTS

| CN | 101180552 A | 5/2008 |
| CN | 101379262 A | 3/2009 |

(Continued)

OTHER PUBLICATIONS

Notice of Preliminary Rejection in corresponding Korean Application No. 2017-7016006, dated Dec. 3, 2018 (13 pages).

(Continued)

*Primary Examiner* — Hovhannes Baghdasaryan
*Assistant Examiner* — Amie M Ndure
(74) *Attorney, Agent, or Firm* — Osha Liang LLP

(57) ABSTRACT

The invention relates to a method for detecting an object in an opening area of a first door (5) of a motor vehicle (1) using at least one first distance sensor (9, 10, 11), the at least one first distance sensor (9, 10, 11) being arranged in and/or on the first door (5) and having a detection area (17, 18, 19), in which a current opening angle (α2) of the first door (5) is detected and the detection area (17, 18, 19) is adapted on the basis of the detected opening angle (α2), a state variable of at least one component of the motor vehicle (1) which differs from the first door (5) being determined, the state variable describing a position and/or an operational setting of the at least one component, and the detection area (17, 18, 19) of (Continued)

the at least one first distance sensor (9, 10, 11) additionally being adapted on the basis of the determined state variable.

14 Claims, 4 Drawing Sheets

(51) Int. Cl.
| | |
|---|---|
| *G01S 15/88* | (2006.01) |
| *G01S 15/87* | (2006.01) |
| *E05F 15/43* | (2015.01) |
| *G01S 7/52* | (2006.01) |
| *G01S 15/08* | (2006.01) |
| *G01S 15/931* | (2020.01) |

(52) U.S. Cl.
CPC .............. *G01S 15/04* (2013.01); *G01S 15/08* (2013.01); *G01S 15/87* (2013.01); *G01S 15/88* (2013.01); *G01S 15/931* (2013.01); *E05F 2015/763* (2015.01); *E05Y 2400/53* (2013.01); *E05Y 2900/531* (2013.01); *G01S 2015/937* (2013.01)

(58) Field of Classification Search
CPC ........ G01S 15/04; G01S 15/88; G01S 15/931; G01S 15/87; G01S 2015/937; E05Y 2400/53; E05Y 2900/531
See application file for complete search history.

(56) References Cited

U.S. PATENT DOCUMENTS

2008/0177994 A1* 7/2008 Mayer .................. G06F 9/4418
713/2
2013/0263511 A1* 10/2013 Agam ..................... G01S 7/527
49/31
2014/0373447 A1* 12/2014 Gunreben .......... G07C 9/00309
49/31

FOREIGN PATENT DOCUMENTS

| CN | 202029750 U | 11/2011 |
|---|---|---|
| CN | 103080770 A | 5/2013 |
| CN | 203318338 U | 12/2013 |
| DE | 10 2004 062 370 A1 | 6/2006 |
| DE | 10 2008 056201 A1 | 5/2010 |
| DE | 10 2010 056171 A1 | 6/2012 |
| DE | 10 2011 121775 B3 | 1/2013 |
| EP | 1 564 358 A1 | 8/2005 |
| EP | 1562054 A2 | 8/2005 |
| JP | H02157383 A | 6/1990 |
| JP | 2005 240545 A | 9/2005 |
| JP | 2006 256362 A | 9/2006 |
| KR | 20140128964 A | 11/2014 |
| WO | 2005110788 A2 | 11/2005 |

OTHER PUBLICATIONS

The Notification of Reason for Rejection in corresponding Japanese Application No. 2017-531276, dated Jun. 29, 2018 (5 pages).
International Search Report issued in PCT/EP2015/078343 dated Mar. 9, 2016 (2 pages).
Written Opinion of the International Searching Authority issued in PCT/EP2015/078343 dated Mar. 9, 2016 (6 pages).
German Search Report issued in DE 10 2014 118 318.5 dated May 4, 2015 (10 pages).
The First Office Action issued in corresponding Chinese Patent Application No. 201580072194.9, dated Jan. 17, 2018 (14 pages).

* cited by examiner

METHOD FOR DETECTING AN OBJECT IN AN OPENING AREA OF A DOOR OF A MOTOR VEHICLE, DRIVER ASSISTANCE SYSTEM, AND MOTOR VEHICLE

The present invention relates to a method for detecting an object in an opening area of a first door of a motor vehicle using at least one first distance sensor, the at least one first distance sensor being arranged in and/or on the first door and having a detection area, in which a current opening angle of the first door is detected and the detection area is adapted on the basis of the detected opening angle. The invention also relates to a driver assistance system for a motor vehicle. Finally, the present invention relates to a motor vehicle having such a driver assistance system.

Interest focuses in the present case on distance sensors, in particular, which can be used to determine a distance between a motor vehicle and an object. Such distance sensors may be in the form of ultrasonic sensors, radar sensors or optical sensors, for example. The prior art discloses driver assistance systems which assist the driver when opening a door. In this case, one or more distance sensors in the door can be used to detect whether an object or an obstacle is in an opening area of a door. If this is the case, the opening angle of the door can be limited using a corresponding actuating device in such a manner that the door does not collide with the object during opening.

In this respect, DE 10 2004 062 370 A1 describes an apparatus for detecting an object in a region of a movably mounted body part. The apparatus is used to detect an object in a region of the entire area of a body part movably mounted on a motor vehicle, the transmitting device and the receiving device being arranged on the body part in such a manner that an emission area occupied by the radiation from the transmitting device is substantially parallel to and completely over the area of the body part.

DE 10 2008 056 201 A1 discloses a motor vehicle having at least one vehicle part which can be moved into an open position and a closed position, in particular a flap and/or a door. In this case, a sensor is arranged on the vehicle part in such a manner that the detection area of the sensor is moved with the vehicle part during movement of the latter and precedes the vehicle part, at least in certain areas, in the movement direction of the vehicle part.

In addition, EP 1 564 358 A1 discloses a detection system for detecting a movable object with respect to a movable door. In this case, a sensor for detecting the object and a door position sensor are provided in the movable door. The detection area of the sensor is adapted as a function of the detected position of the door.

The object of the present invention is to show a solution of how an object can be detected more reliably in an opening area of a door of a motor vehicle.

This object is achieved, according to the invention, by means of a method, by means of a driver assistance system and by means of a motor vehicle having the features according to the respective independent patent claims. The dependent patent claims, the description and the figures relate to advantageous embodiments of the invention.

A method according to the invention is used to detect an object in an opening area of a first door of a motor vehicle using at least one first distance sensor, the at least one first distance sensor being arranged in and/or on the first door and having a detection area. In the method, a current opening angle of the first door is detected and the detection area is adapted on the basis of the detected opening angle. Furthermore, a state variable of at least one component of the motor vehicle which differs from the first door is determined, the state variable describing a position and/or an operational setting of the at least one component, and the detection area of the at least one first distance sensor is additionally adapted on the basis of the determined state variable.

The method is used to detect an object or an obstacle in an opening area of a first door of a motor vehicle. The first door may be, in particular, one of the rear doors in a motor vehicle having front and rear doors. In this case, provision is made of at least one distance sensor which is arranged on the door or inside the door at least in certain areas. The at least one distance sensor may also be arranged in a manner concealed behind a body panel of the door. The first door can be moved or pivoted between a closed position and an open position. The opening area of the first door describes, in particular, the area in which the door can be moved between the closed position and the open position. The opening area is therefore the area which can be occupied by the door during movement. The at least one distance sensor may be a radar sensor or a laser sensor, for example. The at least one distance sensor is preferably an ultrasonic sensor. The distance sensor may be designed, in particular, according to the echo sounding principle. That is to say, it emits a transmission signal which is reflected by the object and strikes the distance sensor again. The distance to the object can be determined on the basis of the propagation time of the transmission signal. The distance sensor has a detection area in which it can detect objects or the distance between the distance sensor and the object.

The opening angle of the first door is also detected. This can be carried out, for example, using a corresponding sensor which can be used to detect the current position of the first door. The detection area of the at least one distance sensor can be adapted on the basis of the detected opening angle. The detection area of the distance sensor can be detected when the first door is closed and can be used as the reference detection area. If the first door is opened, the detection area of the first sensor can be adapted such that this reference detection area is not crossed.

If the first door is in the closed position, the detection area may have a predetermined value. This value may be stipulated on the basis of the installation position of the distance sensor. In the present case, the detection area is adapted if the first door opens. The further the door is opened, that is to say the opening angle is increased, the more the detection area can be reduced. This makes it possible for the opening area of the first door to be able to be detected by the first distance sensor and not to project beyond the sensor during opening of the door. In the present case, a state variable of a further component of the motor vehicle is recorded in addition to the opening angle of the first door. The state variable may describe a position and/or an operational setting of the at least one further component. The detection area is then additionally detected on the basis of the determined state variable.

The present invention is based on the knowledge that the first distance sensor in the first door can identify other components of the motor vehicle as obstacles. For example, a part of the body or the wheel can be identified as an obstacle when the first door is opened. Furthermore, it may be the case that the front door is identified as an obstacle when the rear door opens. Another example is that the front door identifies the wheel of the motor vehicle as an obstacle when it is opened. In the present case, a position of the further component is taken into account when adapting the detection area of the first distance sensor. In this case, an operating state of the at least one further component can also be taken into account. This makes it possible to prevent a component of the motor vehicle itself being identified as an obstacle, for example. An object in the opening area of the first door can therefore be detected more reliably.

The state variable preferably describes a position and/or an operational setting of a second door or a front door of the motor vehicle and/or of a component of the second door, the second door being arranged with respect to the first door in such a manner that, for a predetermined location of the first door, the second door can be pivoted in the detection area of the at least one first distance sensor. In this case, the first and second doors may preferably be arranged on the same side of the vehicle. For example, the first door may be the rear door and the second door may be the front door on the same side of the motor vehicle. If the first door is in a predetermined opening position, it may be the case that the second door can be moved in the detection area of the first distance sensor of the first door. This is taken into account in the present case in the form of the state variable and the adaptation of the detection area on the basis of the state variable. This makes it possible to prevent the second door being identified as an obstacle or an object by the first distance sensor.

In another embodiment, an opening area of the second door of the motor vehicle is determined as the state variable. The opening area of the second door describes, in particular, the area in which the second door can be moved between a closed position and an open position. The opening area of the second door may be stored in a control device, for example, or may be determined on the basis of the dimensions and/or the installation location of the second door. In this case, the detection area of the first distance sensor can be adapted such that it does not overlap the opening area of the second door. The possible opening area of the second door can be taken into account, in particular, if the second door is currently closed. This makes it possible to prevent the second door being incorrectly identified as an obstacle or an object by the first distance sensor during opening.

In another embodiment, a current opening angle of the second door of the motor vehicle is determined as the state variable. The opening angle of the second door may likewise be detected using a corresponding sensor and may be transmitted to a control device of the motor vehicle, for example. The location or position in which the second door is currently situated can therefore be taken into account. This makes it possible to precisely adapt the detection area of the first distance sensor in the first door to the current opening angle of the second door. This makes it possible for objects in the opening area to be able to be reliably identified.

In another embodiment, a detection area of at least one second distance sensor is determined as the state variable, which second distance sensor is arranged in and/or on the second door. In the case of the second distance sensor which is arranged in and/or on the second door, the detection area of the second distance sensor may likewise be adapted on the basis of the opening angle of the second door. In this case too, the state variable of at least one further component of the motor vehicle may be taken into account, in particular, and the detection area of the second distance sensor may be adapted on the basis of the recorded state variable. In this case, provision may also be made for the sensor data from the second distance sensor in the second door to be used to detect the object in the opening area of the first door and vice versa. If the current detection area of the second distance sensor is known, the detection area of the first distance sensor can be adapted to this. This makes it possible to achieve the situation in which large gaps arise between the detection area of the first distance sensor and the detection area of the second distance sensor, for example. This makes it possible to reliably detect the object.

It is also advantageous if a position of a body part of the motor vehicle is determined as the state variable. For example, the outer dimensions of the body of the motor vehicle can be taken into account. The position or the location of the outer surfaces of the body of the motor vehicle may be stored in the control device of the motor vehicle, for example. This makes it possible to prevent a wheel guard or another body part being identified as an obstacle by one of the distance sensors.

In another embodiment, a position of the wheel of the motor vehicle is determined as the state variable. In this case, a pivoting area of at least one steerable wheel of the motor vehicle, for example, can be taken into account in order to adapt the detection area of the distance sensor. Furthermore, provision may be made for the current position of the steerable wheel to be determined. For this purpose, the current position of the wheel can be determined on the basis of the data from the steering angle sensor. It is therefore possible to reliably prevent a wheel, in particular a locked wheel, being identified as an obstacle by the distance sensor, for example the distance sensor in the front door.

In one embodiment, in order to adapt the detection area of the at least one first distance sensor, a threshold value for a reception signal of the at least one first distance sensor is adapted. The first distance sensor may emit, in particular, a transmission signal which is reflected by the object and strikes the first distance sensor again. A reception signal can be determined on the basis of the reflected transmission signal. In this case, only reception signals which exceed a corresponding threshold value for their amplitude can be taken into account, for example, for determining the distance between the distance sensor and the object. The threshold value can be accordingly adapted in order to adapt the detection area of the first distance sensor. This makes it possible to easily adapt the detection area of the first distance sensor and to therefore hide corresponding areas which are not intended to be detected.

In another embodiment, in order to adapt the detection area of the at least one first distance sensor, a reception sensitivity of the at least one first distance sensor is changed. In order to provide the reception signal, the first distance sensor may have corresponding electronics. These electronics can be used, for example, to accordingly amplify the signal which is provided as a result of the reflected transmission signal using a converter or receiver. The amplification can be accordingly adapted in order to adapt the sensitivity. The detection area can therefore be easily adapted.

A driver assistance system according to the invention for a motor vehicle comprises at least one first distance sensor, which is arranged in and/or on a first door of the motor vehicle. The driver assistance system also comprises a control device which is designed to carry out a method according to the invention. The control device may be formed, for example, by a control unit (electronic control unit, ECU) of the motor vehicle.

The driver assistance system preferably has an actuating device for opening the first door and/or for limiting an opening angle of the first door on the basis of an object detected using the at least one first distance sensor. The actuating device may be designed, for example, in such a manner that it limits the opening of the door such that a collision between the first door and the object is prevented. Alternatively or additionally, the actuating device may be designed such that it automatically opens the door. In this case, opening can be enabled only to such an extent that there is no collision between the first door and the object.

In another embodiment, the driver assistance system has a warning device for outputting a warning signal on the basis of the object detected using the at least one first distance sensor. If an object is detected in the opening area of the first door, this can be communicated to the driver of the motor vehicle. In particular, an acoustic, optical and/or haptic warning signal can be output. This makes it possible to reliably achieve the situation in which the door is not damaged during opening.

The at least one distance sensor preferably has an ultrasonic sensor. In this case, provision may also be made for a plurality of distance sensors to be arranged in the first door. The distance sensors may be arranged in a manner distributed along the vehicle longitudinal axis and/or the vehicle vertical axis, for example. The object can therefore be detected in the opening area of the first door. Provision may also be made for at least one distance sensor to be arranged in each door of the motor vehicle.

The motor vehicle according to the invention comprises a driver assistance system according to the invention. The motor vehicle is in the form of a passenger car, in particular.

The preferred embodiments presented with respect to the method according to the invention and their advantages accordingly apply to the driver assistance system according to the invention and to the motor vehicle according to the invention.

Further features of the invention emerge from the claims, the figures and the description of the figures. The features and combinations of features mentioned in the description and the features and combinations of features mentioned below in the description of the figures and/or shown in the figures alone can be used not only in the respectively stated combination but also in other combinations or alone without departing from the scope of the invention. Embodiments which are not explicitly shown and explained in the figures but emerge and can be produced by means of separate combinations of features from the embodiments explained are therefore also considered to have been covered and disclosed by the invention. Embodiments and combinations of features which therefore do not have all features of an originally formulated independent claim can also be considered to have been disclosed.

The invention is now explained in more detail on the basis of a preferred exemplary embodiment and with reference to the accompanying drawings, in which.

Figure 1:
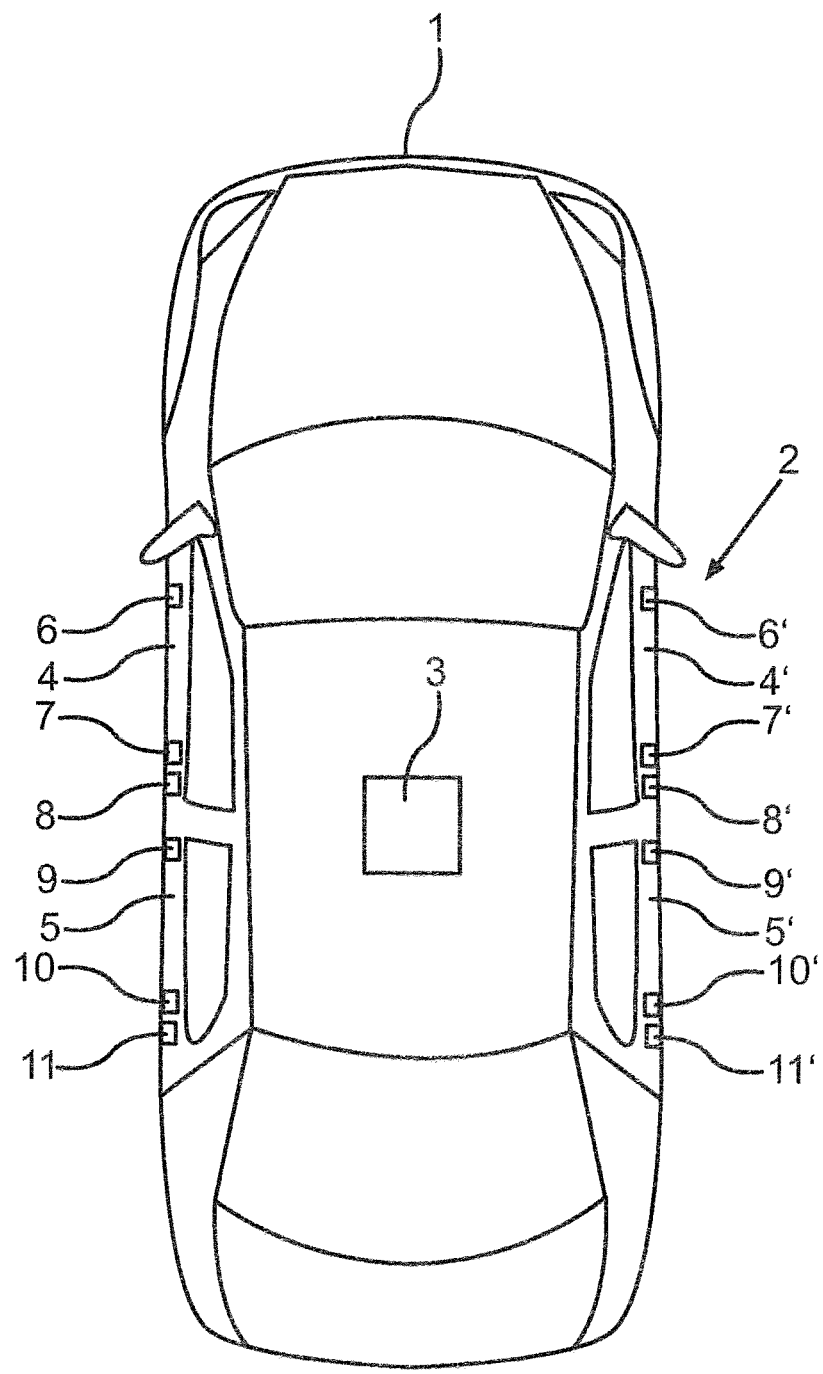
FIG. 1 shows a schematic illustration of a motor vehicle according to one embodiment of the present invention which has a driver assistance system.

FIG. 1 shows a motor vehicle 1 according to one embodiment of the present invention. The motor vehicle 1 is in the form of a passenger car. The motor vehicle 1 also comprises a driver assistance system 2. The driver assistance system 2 is in the form of a so-called door opening assistant, in particular, and assists the driver when opening the doors 4, 4', 5, 5'.

In the present exemplary embodiment, the motor vehicle 1 comprises four doors 4, 4', 5, 5'. In this case, a first door 5 or the rear door is provided on the left-hand side of the motor vehicle. A second door 4 or front door is also provided. The first door 5 comprises at least one first distance sensor. In the present case, the first door 5 comprises three distance sensors 9, 10 and 11. The second door 4 comprises at least one second distance sensor. In the present case, the second door 4 comprises three distance sensors 6, 7 and 8. The distance sensors 6, 7, 8, 9, 10 and 11 can each be used to detect an object in an opening area of the door 4, 5. The distance sensors 6 to 11 can also be used to detect a distance between the respective distance sensor 6 to 11 and the object. The distance sensors 6 to 11 are in the form of ultrasonic sensors, in particular. The front door 4' on the right-hand side of the motor vehicle 1 is structurally identical to the left-hand front door or second door 4 and comprises the distance sensors 6' to 8'. In addition, the rear door 5' which is arranged on the right-hand side of the motor vehicle 1 is structurally identical to the right-hand rear door or first door 5 and comprises the distance sensors 9' to 11'.

The distance sensors 6 to 11 and 6' to 11' are connected to the control device 3 for the purpose of transmitting data. In the present case, corresponding data lines are not illustrated for the sake of clarity. The distance values recorded using the distance sensors 6 to 11 and 6' to 11' can therefore be transmitted to the control device. Each door 4, 4', 5, 5' also comprises a corresponding sensor with which the respective opening angle of the door 4, 4', 5, 5' or the current position of the door 4, 4', 5, 5' can be detected and can be transmitted to the control device 3.

Figure 2:
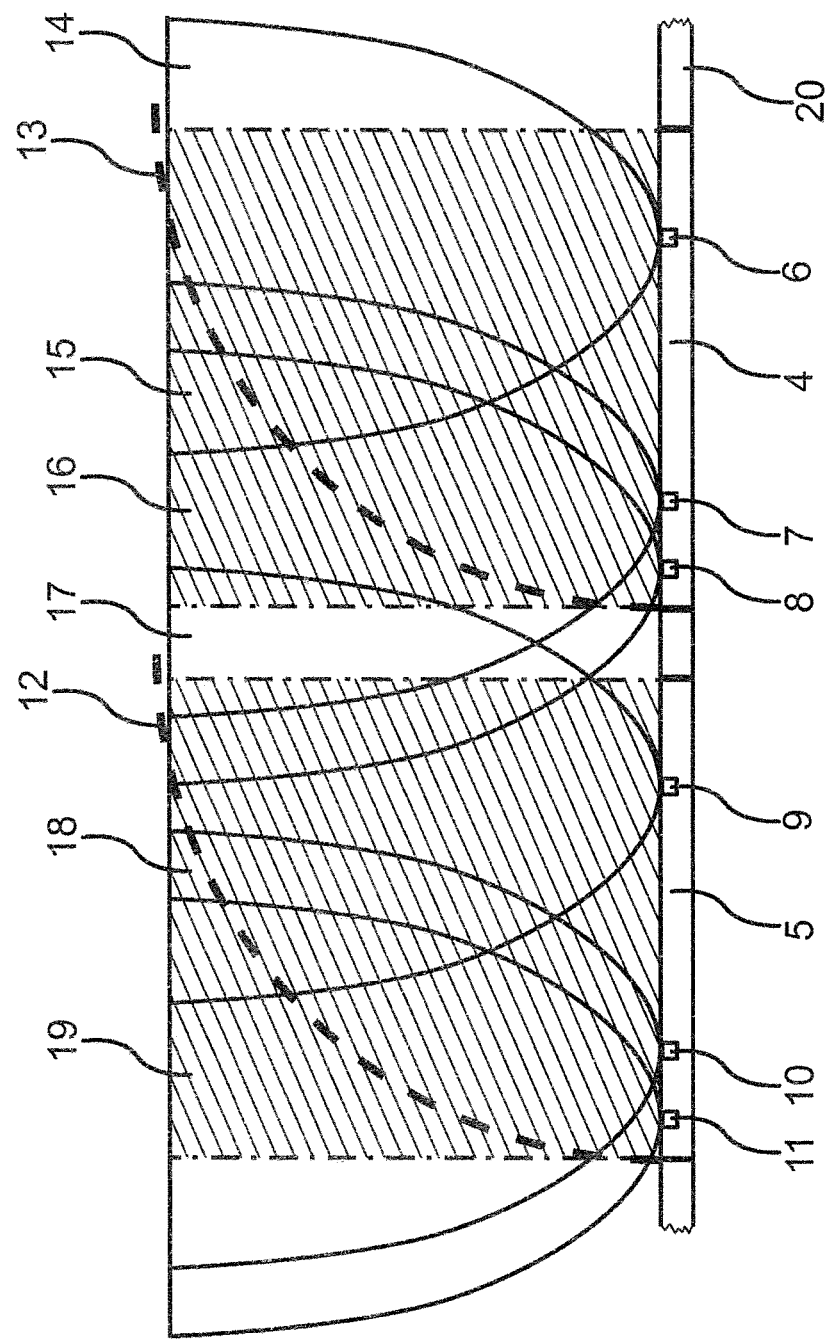
FIG. 2 shows a schematic illustration of the left-hand doors of the motor vehicle, in which distance sensors are arranged, and the detection areas of the distance sensors.

FIG. 2 shows a partial illustration of the motor vehicle 1, the first door 5 and the second door 4 being illustrated. The distance sensors 9 to 11 in the first door 5 and the distance sensors 6 to 8 in the second door 4 are also illustrated. In the example of FIG. 2, the first door 5 and the second door 4 are closed. The respective detection areas 14 to 19 of the distance sensors 6 to 11 are also illustrated. The distance sensor 6 has a detection area 14, the distance sensor 7 has a detection area 15, the distance sensor 8 has a detection area 16, the distance sensor 9 has a detection area 17, the distance sensor 10 has a detection area 18 and the distance sensor 11 has a detection area 19. The detection areas 14 to 19 describe the areas in which an object can be detected using the respective distance sensors 6 to 11. The dashed lines 12 and 13 are also shown in FIG. 2. The dashed lines 12 and 13 illustrate the respective opening area of the doors 4 and 5. The opening area 4, 5 describes the area in which the doors 4, 5 can be pivoted or moved during opening. The respective line 12, 13 describes the outer limit of the respective opening area.

Figure 3:
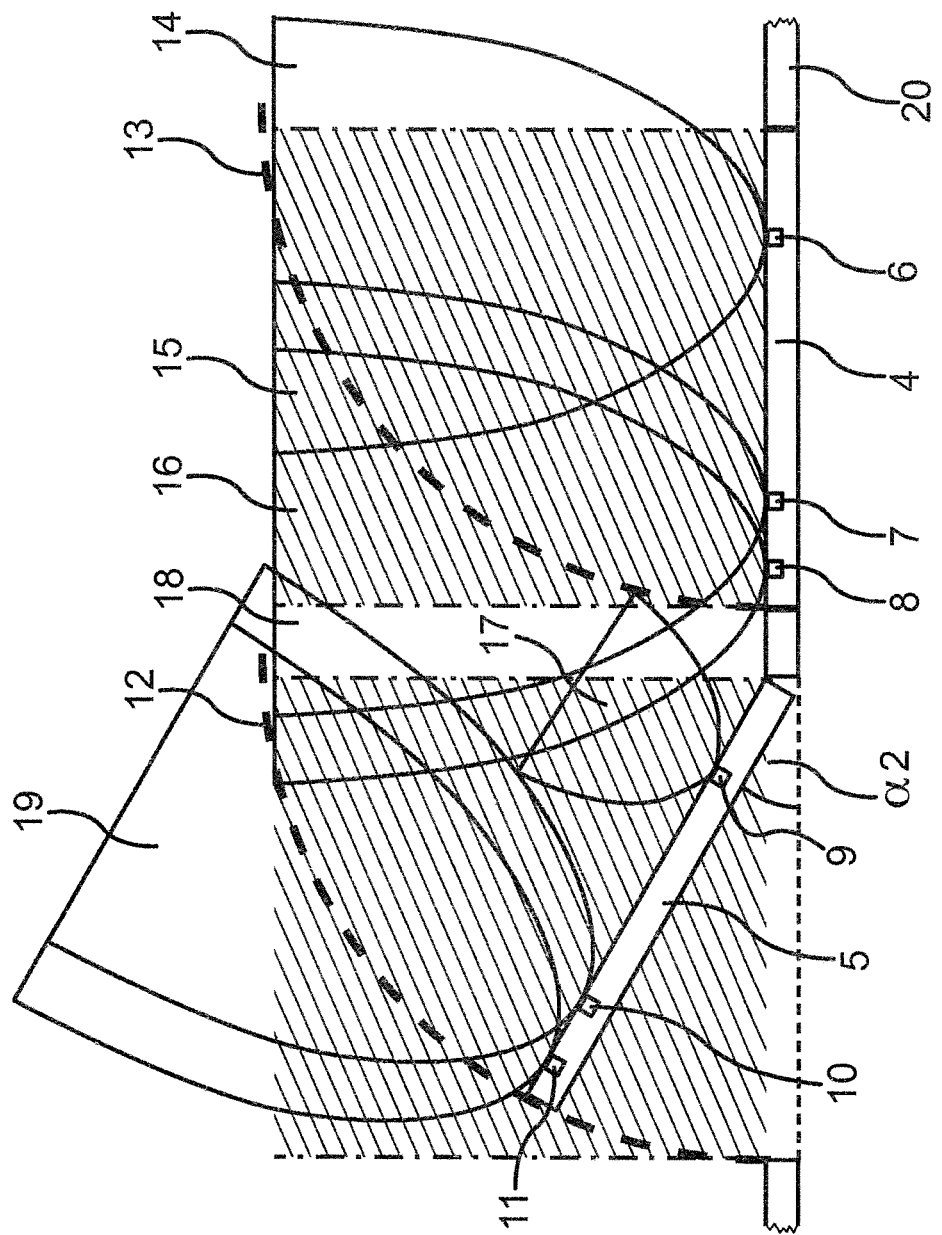
FIG. 3 shows the doors according to FIG. 2, a first door being open at least in certain areas.

FIG. 3 shows the two doors 4, 5, the first door 5 being open at least in certain areas. In the present case, the first door 5 is open by the opening angle α2. The detection areas 17 to 19 of the distance sensors 9 to 11 are adapted on the basis of the opening angle α2 of the first door 5. For this purpose, the current opening angle α2 of the first door 5 is continuously detected. The detection areas 17 to 19 of the distance sensors 9 to 11 are accordingly adapted on the basis of the current opening angle α2. In particular, the detection areas 17 to 19 are reduced when opening the first door 5. This makes it possible to prevent an object which is outside the opening area of the first door 5 being detected.

In the present case, the opening area of the second door 4 is also taken into account in order to adapt the detection areas 17 to 19. In the present case, it can be seen that the detection area 17 of the distance sensor 9 is adapted in such a manner that it does not project beyond the line 13 and the detection area 17 therefore does not overlap the opening area of the second door 4. Such adaptation of the detection areas 17 to 19 is carried out, in particular, when the first door 4 is currently closed. This makes it possible to prevent the second door 4 being identified as an object or an obstacle during opening in the shown position of the first door 5.

Figure 4:
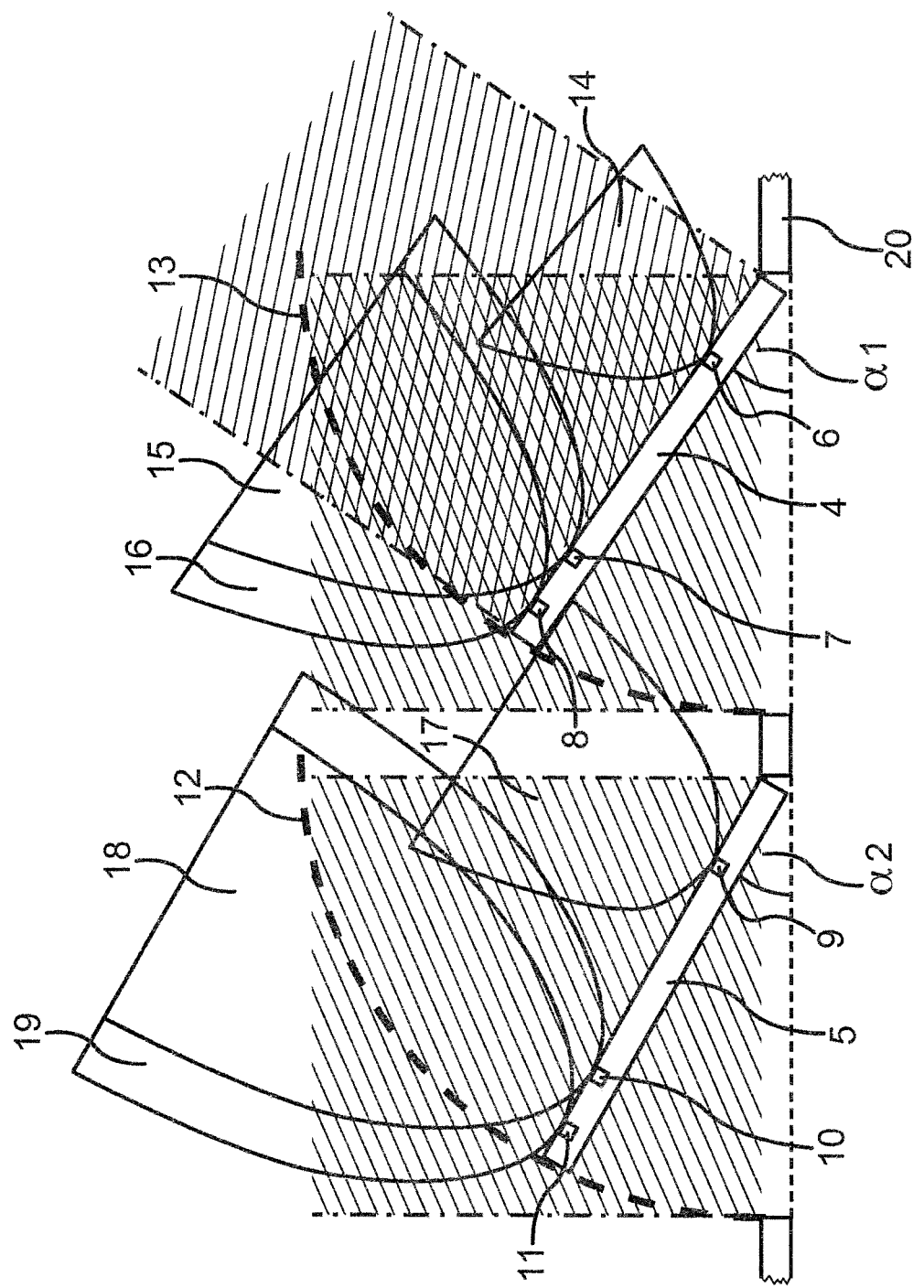
FIG. 4 shows the doors according to FIG. 2, the first door and a second door being open at least in certain areas.

FIG. 4 shows another example in which the second door 4 is likewise open. In the present case, the second door 4 has been pivoted by the opening angle α1. The detection areas 14 to 16 of the distance sensors 6 to 8 in the second door 4 are likewise adapted on the basis of the current opening angle α1. In this case, a position of a further body part 20, for example a wheel guard, is additionally taken into account. The locations of the outer surfaces of the body parts of the motor vehicle may be stored in the control device 3, for example. The respective detection area 14, 15, 16 of the distance sensors 6 to 8 can be adapted on the basis of the position of the body part 20. It is therefore possible to prevent the wheel guard being identified as an obstacle, for example.

In the present case, the detection areas 17 to 19 of the distance sensors 9 to 11 in the first door 5 are also adapted on the basis of the current opening angle α1 of the second door 4. In this case, the dimensions of the second door 4 can also be taken into account. In particular, the length and the thickness of the second door 4 can be taken into account. For example, the detection area 17 of the distance sensor 9 is larger than the arrangement according to FIG. 3. An object which is in the area between the first door 5 and the second door 4 can therefore be reliably detected, for example. A further solution for avoiding the second door 4 being identified as an obstacle using the distance sensors 9 to 11 of the first door involves the distance sensor 9 to 11, and in particular the front distance sensor 9, adapting their detection areas 17 to 19 in such a manner that they do not cross the area of the first door 4 (left-hand hatched area).

A corresponding actuating device may be respectively provided in the doors 4, 4', 5, 5'. The actuating device can limit the opening angle α1, α2 of the doors 4, 4', 5, 5' on the basis of the position of the object in the opening area of the respective doors 4, 4', 5, 5' during opening. Alternatively or additionally, the actuating device may open only to such an extent that there is no collision between the respective door 4, 4', 5, 5' and the object.

The invention claimed is:

1. A method for detecting an object in an opening area of a first door of a motor vehicle using at least one first distance sensor, the at least one first distance sensor being arranged in and/or on the first door and having a detection area, the method comprising:
   detecting a current opening angle of the first door by using a corresponding sensor to detect a current position of the door;
   adapting the detection area of the at least one first distance sensor on the basis of the detected opening angle;
   determining a state variable of at least one component of the motor vehicle which differs from the first door, the state variable describing a position and/or an operational setting of the at least one component;
   further adapting the detection area of the at least one first distance sensor on the basis of the determined state variable so as to avoid any part of the motor vehicle itself being identified as the object detected; and
   detecting the object in the opening area of a first door based on the further adapted detection area.

2. The method according to claim 1, wherein the state variable describes a position and/or an operational setting of a second door of the motor vehicle and/or of a component of the second door, the second door being arranged with respect to the first door such that, for a predetermined location of the first door, the second door is pivoted in the detection area of the first distance sensor.

3. The method according to claim 2, wherein an opening area of the second door of the motor vehicle is determined as the state variable.

4. The method according to claim 2, wherein a current opening angle of the second door of the motor vehicle is determined as the state variable.

5. The method according to claim 2, wherein a detection area of at least one second distance sensor is determined as the state variable, wherein the second distance sensor is arranged in and/or on the second door.

6. The method according to claim 1, wherein a position of a body part of the motor vehicle is determined as the state variable.

7. The method according to claim 1, wherein a position of a wheel of the motor vehicle is determined as the state variable.

8. The method according to claim 1, wherein to adapt the detection area of the at least one first distance sensor, a threshold value for a reception signal of the at least one first distance sensor is adapted.

9. The method according to claim 1, wherein to adapt the detection area of the at least one first distance sensor, a reception sensitivity of the at least one first distance sensor is changed.

10. A driver assistance system for a motor vehicle, comprising:
    at least one first distance sensor, which is arranged in and/or on a first door of the motor vehicle; and
    a control device which is designed to carry out a method according to claim 1.

11. The driver assistance system according to claim 10, further comprising an actuating device for opening the first door and/or for limiting an opening angle of the first door on the basis of an object detected using the at least one first distance sensor.

12. The driver assistance system according to claim 10, further comprising a warning device for outputting a warning signal on the basis of the object detected using the at least one first distance sensor.

13. The driver assistance system according to claim 10, wherein the at least one first distance sensor has an ultrasonic sensor.

14. A motor vehicle having a driver assistance system according to claim 10.

* * * * *